J. B. Wortendyke.

Cutting Paper for Paper Twine.

No. 1825. Reissued Nov 22. 1864.

Witnesses
Jas P. Hall
Wm F. McNamara

Inventor
John B. Wortendyke

UNITED STATES PATENT OFFICE.

JOHN B. WORTENDYKE, OF GODWINVILLE, NEW JERSEY.

MACHINE FOR CUTTING PAPER FOR PAPER TWINE, &c.

Specification forming part of Letters Patent No. 44,249, dated September 13, 1864; Reissue No. 1,825, dated November 22, 1864.

*To all whom it may concern:*

Be it known that I, J. B. WORTENDYKE, of Godwinville, in the county of Bergen and State of New Jersey, have invented new and Improved Machinery for Cutting Paper for the Manufacture of Paper Twine, and for other purposes; and I do hereby declare that the following is a full, clear, and exact description thereof, reference being had to the accompanying drawings, forming part of this specification.

The object of this invention is to facilitate the cutting of paper from a continuous roll into strips. The invention is designed more especially for cutting paper for the manufacture of paper twine, but it may be advantageouly used for other purposes where paper requires to be cut into narrow strips.

The invention consists, first, in the employment or use of two rollers in connection with a grooved cylinder and a cylinder of cutters arranged in such a manner as to insure the proper cutting of the paper in an expeditious manner.

The invention consists, secondly, in the employment or use, in combination with the cutting devices, of separate sets of receiving or take-up rollers, for receiving or taking away the cut strips of paper from the said devices, whereby the said strips are carried away from the said devices without the liability of one strip lapping over or upon, or otherwise interfering with, the strip contiguous to it.

The invention consists, thirdly, in a novel manner of attaching to their shafts the rollers on which the cut strips are received, or by which the said strips are taken away from the cutting devices, whereby the said strips are kept at a proper tension to prevent their interference with each other, without being subjected to any undue strain.

To enable others to make and use my invention, I will proceed to describe it with reference to the drawings, which represent one of the forms in which I have contemplated constructing the machine, and in which—

Figure 1:
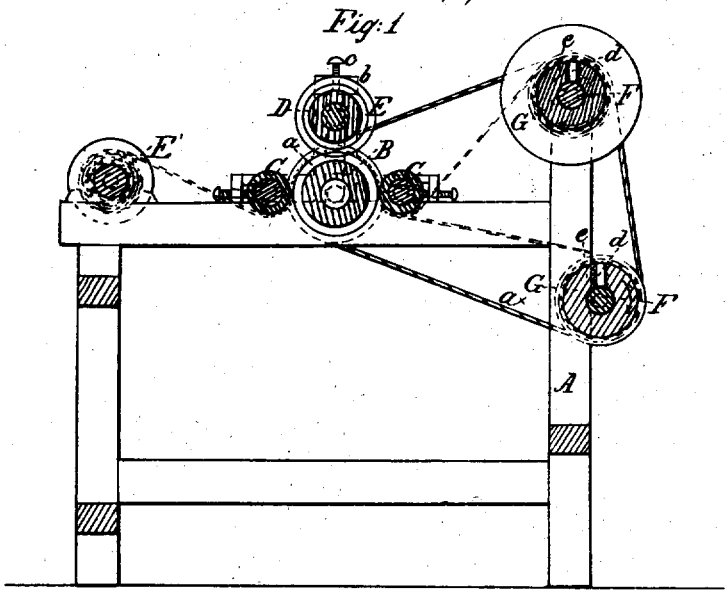
Figure 2:
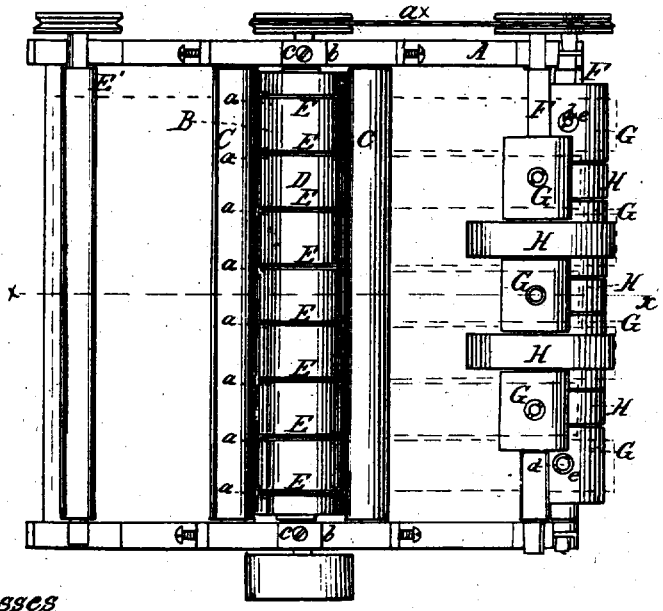

Figure 1 is a vertical section of the machine in the plane indicated in the line *x x* of the plan or top view, Fig. 2.

Similar letters of reference indicate corresponding parts in both figures.

A represents a framing of rectangular form and constructed in any proper manner to support the working parts. B is a cylinder placed horizontally on the framing A, and having a roller, C, at each side of it, the axes of the rollers C C being in the same horizontal plane. These rollers C may be covered with felt, india-rubber, or other suitable material, to give them a surface which will be yielding or pliable to a certain degree. Directly over the cylinder B, and in the same axial plane, there is a cylinder, D, which is provided with a series of circular cutters, E, at suitable and equal distances apart, said cutters working or fitting in grooves *a* made circumferentially in the cylinder B, so that the periphery of the cylinder D may work in contact with that of cylinder B. The journals of the cylinder D are fitted in slotted uprights *b*, at each side of the framing A, with set-screws *c* in their upper ends, by which the pressure of D on B, or rather the pressure of D on the paper which passes between D and B, may be regulated as desired.

E′ is a roller placed on the framing A, at one end of it, and having the paper which is to be cut wound upon it in a continuous roll. At the opposite end of the framing there are placed two parallel shafts, F F, one above the other, and on these shafts the receiving or take-up rollers G, on which the cut paper strips are wound, are placed in two sets, one set on the upper and the other set on the lower shaft, the number in each set being equal to half the number of strips into which the roll of paper is cut. These rollers are not keyed on their shafts, but secured thereon by friction, which result is obtained by a piece of india-rubber, *d*, inserted in a hollow screw, *e*, passing into the rollers radially from their peripheries. The rubber *d* may be made to press in a greater or less degree on the shafts F by turning or adjusting the screws *e*. Between the rollers G and upon the shafts F disks H may be placed.

The paper to be cut passes from the roller E′ underneath the rollers C C and over the cylinder B, the rollers C C keeping the paper snugly down on the upper part of B, so that the cutters E can act in the most efficient manner in cutting the paper into strips. This feature of the two rollers C C, placed at opposite sides of the cylinder B, is an important one, for whether the tension to which the paper is subjected in passing through the machine be greater or less, it cannot effect the proper action of the cutters on the paper, for the latter will always be pressed snugly over the cylinder B. The strips, as they are cut, will be wound upon the two sets of rollers G on the two separate and parallel shafts F F, passing alternately from the cutters to the rollers on the two shafts—that is to say, one strip passing to a roller on one shaft and the next strip on either side of it passing to a roller on the other shaft.

By this arrangement or division of the rollers in two sets on two shafts the rollers are kept out of contact with each other, and the paper strip passing to one roller is prevented from lapping over or interfering with the next strip on either side of it as the several strips are conveyed away from the cutters.

The disks H keep the rollers G at the required distance apart, and they may, if desired, be of greater diameter than the rollers, in order to serve as guides for the strips while being wound upon the rollers. These disks are not, however, indispensable.

By having the rollers G secured on the shafts F by friction a sufficient tension of the cut strips of paper is secured while they are being taken away from the cutters, and yet the said strips are prevented from being subjected to any undue tension, which would otherwise occur in case of the roll of paper being of an irregular thickness, and it insures the strips being wound compactly on the rollers.

In case, for instance, one of the strips is subjected to too much tension in being taken away from the cutters by its respective roller G, the latter will be held stationary or its revolution be retarded and its shaft F allowed to slip within it until the tension is reduced, so that the friction produced by the spring or rubber *d* is able to turn the roller.

In working the machine power is applied to the cylinder B and motion communicated therefrom to the shafts F by a bolt, $a^{\times}$.

Having thus described a machine in which one mode of applying each of the several features of my invention is illustrated, I will state that in the application of more than one set of rollers to take away the several cut strips of paper from the cutters in such manner as to separate the said strips and prevent each from interfering with those on either side of it, I do not confine myself to the use of rollers on which the strips are wound by power applied to the shafts upon which the said rollers are placed (as they are by the rollers G represented;) nor do I confine myself at all to the use of rollers upon which the strips are wound; but I consider any two or more sets of rollers by which the strips are taken from the cutters and separated in a similar manner to be the equivalents of the rollers G and to be embraced in my invention.

What I claim, and desire to secure by Letters Patent, is—

1. The two rollers C C, in combination with the cylinders B B, arranged relatively with each other to operate in the manner substantially as and for the purpose herein set forth.

2. The employment, in combination with cutting devices for cutting paper into strips, of separate sets of receiving or take-up rollers for receiving or taking away the cut strips from the said cutting devices, whereby the strips are separated from and prevented from interfering with each other, in a manner substantially as herein described.

3. In combination with the cutting devices for cutting the paper into strips, the securing of the receiving or take-up rollers, which take the strips of paper from the cutters to their respective shafts by means of friction devices, for the purpose of allowing the several rollers to have separate or independent movements, substantially as set forth.

JOHN B. WORTENDYKE.

Witnesses:
HENRY T. BROWN,
JOHN W. COOMBS.